United States Patent [19]

Kuse et al.

[11] Patent Number: 5,671,379
[45] Date of Patent: Sep. 23, 1997

[54] SYSTEM AND METHOD FOR MANAGING WINDOWS

[75] Inventors: Kazushi Kuse, Urayasu; Kinichi Mitsui, Asaka; Tsuyoshi Ohira, Urawa, all of Japan; Shahram Javey, Toronto, Canada

[73] Assignee: International Business Machines Corporation, Armonk, N.Y.

[21] Appl. No.: 15,365

[22] Filed: Jan. 29, 1993

[51] Int. Cl.⁶ ............................................. G09G 5/14
[52] U.S. Cl. ................ 395/346; 395/340; 345/119
[58] Field of Search ........................... 340/721, 723, 340/724; 395/156, 157, 159, 340, 346, 348, 349; 345/115, 119, 120

[56] References Cited

U.S. PATENT DOCUMENTS

| | | | |
|---|---|---|---|
| 4,712,191 | 12/1987 | Penna | 395/156 |
| 4,829,453 | 5/1989 | Katsuta et al. | 340/723 |
| 5,040,131 | 8/1991 | Torres | 395/156 |
| 5,148,154 | 9/1992 | Mackay et al. | 340/721 |
| 5,237,653 | 8/1993 | Noguchi et al. | 340/721 |

FOREIGN PATENT DOCUMENTS

| | | |
|---|---|---|
| 0287858 | 3/1988 | European Pat. Off. . |
| 4070926 | 4/1990 | Japan . |
| 2005092 | 9/1990 | Japan . |

OTHER PUBLICATIONS

A Visual Shell Interface To A Database, Lawrence A. Rowe, Peter Danzig and Wilson Choi, Computer Sicence Division, EECS Department, University of California, 1989 by John Wiley & Sons, Ltd. pp. 515-528.

*Primary Examiner*—Kee M. Tung
*Assistant Examiner*—Matthew Luu
*Attorney, Agent, or Firm*—Jeffrey S. LaBaw

[57] ABSTRACT

Graphical objects are used to set the relationships between a plurality of windows presented on a system display. The window relationships can be set by performing operations on the graphical objects, for instance, by selection by mouse click. Further, the relationships can be represented by changes in the display mode of the graphical objects. Thus, the invention enables the user to freely set the relationships between a plurality of windows and easily understand the relationships.

16 Claims, 6 Drawing Sheets

■ Banch name list

Roppongi
Hakozaki
Yamato
Fujisawa
Sanbancho

⊞ Annual sales graph

⊞ Employee name list

Takayama
Miyazawa
Tanaka
Nakamura
Yasuda

⊞ Areas covered

SYSTEM AND METHOD FOR MANAGING WINDOWS

FIELD OF THE INVENTION

This invention is generally related to a system and method for managing windows. More particularly, it is related to a system and method in which relationships between a plurality of windows can easily be established and the user can easily grasp these relationships.

Generally, application programs using a window system, such as browsers for databases and language processors, control a plurality of windows, including the sub-windows generated in the windows. The relationships between these windows are usually fixed by the application program.

Figure 1:
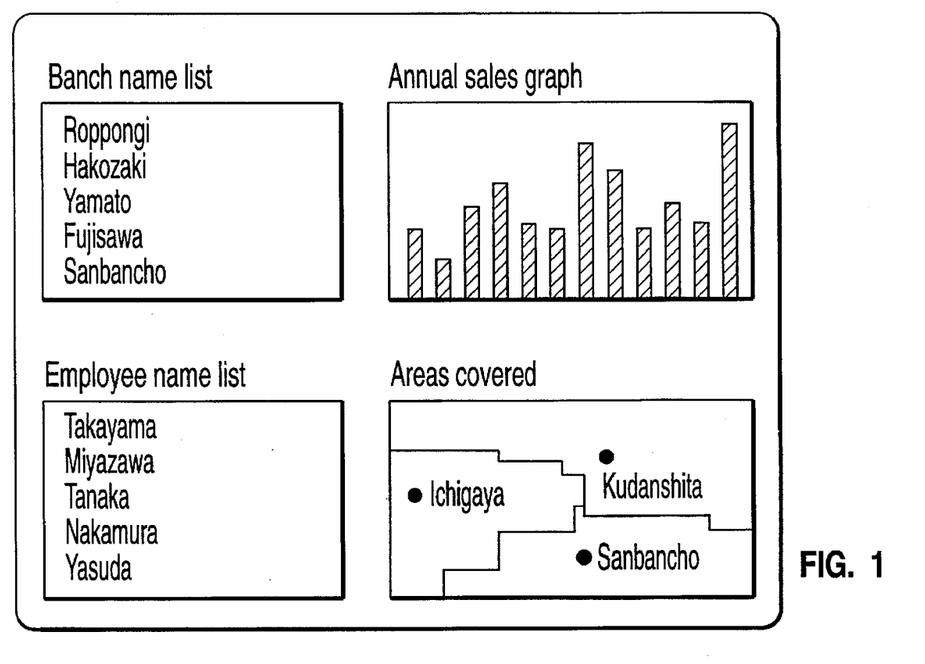
FIG. 1 is an illustration showing an example screen display of an application program having four windows.

For example, the application program shown in FIG. 1 consists of four windows. The windows are respectively displaying a list, a second list, a graph and a diagram. In this example, the branch names of an automobile sales company are displayed in the first windows, and the employee names belonging to each branch are displayed in the second list window. The graph window displays the annual sales for each branch or each employee on a monthly basis in a graph. The diagram window displays the areas covered by each branch or each employee on a map.

Since the relations between the windows are fixed in the conventional approach, the following operations are generally performed. First, if one branch is selected from the branch name list, the information on that branch is automatically displayed on the remaining three windows. Second, if one employee is selected from the employee name list, the annual sales graph and the areas for that employee are automatically displayed.

In this example, the upper-right annual sales graph window can display sales both by branch and by employee. Also, the area window can similarly display the areas covered by a branch and those covered by an employee.

In such a conventional technique, by simply selecting a data item, the related windows can automatically be operated, and thus operation is simple. However, since the directions for data movement between windows and the types of destination windows, such as list, graph, diagram, text, are previously fixed, the flexibility of operability is small. For instance, operations such as changing the display of only the branch names and the sales without linking this with the graph window or carrying the data from the graph window in the list cannot be performed.

An example of such conventional window management is described in detail, for instance in Chapter 4, "Source Code Browse", of Reference Manual, Rel. 2 of "Objects/C++", Fuji-Xerox Information Systems Co., Ltd.

To avoid the above-stated inconvenience of the conventional technique, it is also possible for the relationships between windows to be specified for each operation without being preset. To be specific, a user may first specify the data in a window in which data is specified in a source window. Then, the user may specify a window in which the attributes of the specified data are to be displayed, the destination window. For instance, the user may select the take-in button of the destination window. Then, the user may determine the attribute to be displayed in the destination window by selecting a view. If this is acceptable with the current view, the user continues the execution. In this way, the desired attribute data of a data instance selected in the source window is displayed in a desired destination window with a desired view.

The following are examples of uses in which the user specifies the source and destination of data for each operation in FIG. 1. First, when one branch is selected from the branch name list and a take-in operation is performed in the graph window, the annual sales for the branch are displayed. Second, when one branch is selected from the branch name list and a take-in operation is performed in the diagram window, the areas covered by the branch are displayed. Third, when one employee is selected from the employee name list and a take-in operation is performed in the graph window, the annual sales for the employee are displayed. Fourth, when one employee is selected from the employee name list and a take-in operation is performed in the graph window, the areas covered by the employee are displayed.

In this case, the data destination can be flexibly switched. However, in a continuous operation such as sequentially displaying the sales graph and area diagram for each branch, it is necessary to perform a take-in operation in the graph and diagram windows each time the branch name is changed, and thus the number of operations will be at least three times that of the former method.

Other prior references related to this invention include Published Unexamined Japanese Patent Application No. 273947/1988. This prior reference discloses that, when a data instance in a card-like window is pointed to, another window is automatically generated and the predetermined attributes of the data instance are automatically displayed in this window. However, this reference contains no description of setting the relationships between windows by instructions to a graphical window, or displaying the relationships through graphical objects.

SUMMARY OF THE INVENTION

It is, therefore, an object of the present invention to enable the user to freely change the relationships between windows and easily understand those relationships.

This object and others are achieved by graphical user interface in which the relationships between a plurality of windows to be displayed are set according to the preferences of the user. The relationships can be set by operation on the graphical objects, for instance, a mouse click, and this selection can be represented by a change in the display mode of the graphical objects.

DETAILED DESCRIPTION OF THE DRAWINGS

DETAILED DESCRIPTION OF THE DRAWINGS

Figure 2:
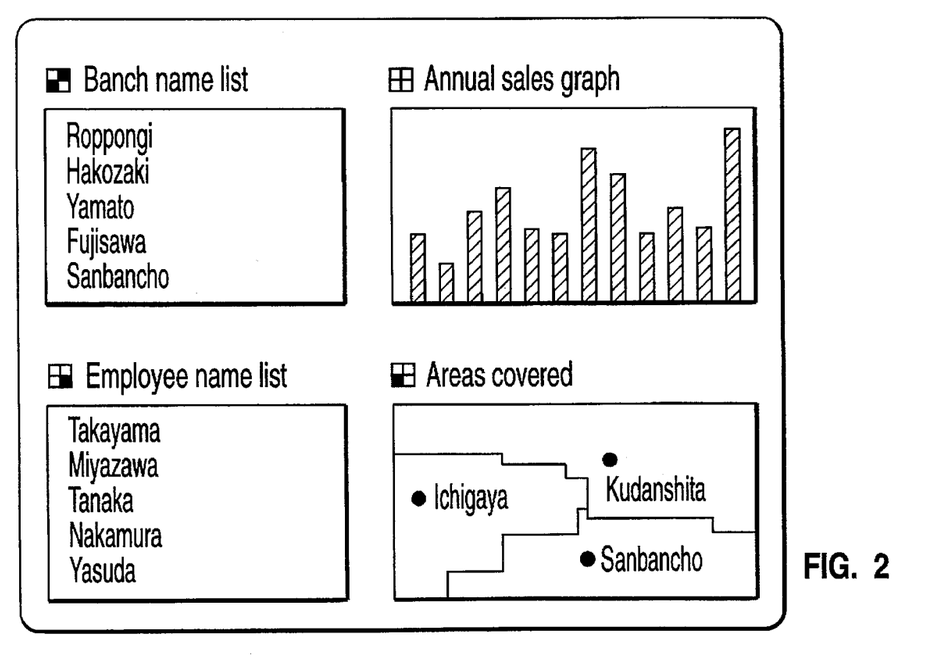
FIG. 2 is an illustration showing an example screen display of this invention.

In an embodiment shown in FIG. 2, there are the same number of buttons as there are windows and they are arranged as the windows are arranged. One button is provided for each window. In the case of FIG. 2, four buttons are arranged in the shape of a square, and one set thereof is provided for each window. One button is displayed in reverse-video by selecting it with a mouse or corresponding key.

Each button corresponds to an individual window. At first, all the buttons are unselected, and they are all white. In this state, none of the windows are related, and for data movement, source and destination are specified for each operation. To perform the same operation a plurality of times, buttons corresponding to destination windows are selected from the quadrant four buttons of the window from which data is desired to be taken out. Thereafter, the relationships between the source and destination windows are maintained until those buttons are selected again and released. Merely by selecting data within a window, the related windows are linked with it. For instance, to relate the branch name list to the employee name list and to annual sales, the employee name list to the areas, and the areas to the employee name list, the respective quadrant buttons are selected as shown in FIG. 2.

In accordance with this invention, relationships between windows can be set up for fixed operations as is done conventionally, whereas relationships can be performed operation by operation if more flexible operations are required, thereby providing for a wide range of demands by users.

Now, a preferred embodiment of this invention is described with reference to drawings.

Figure 3:
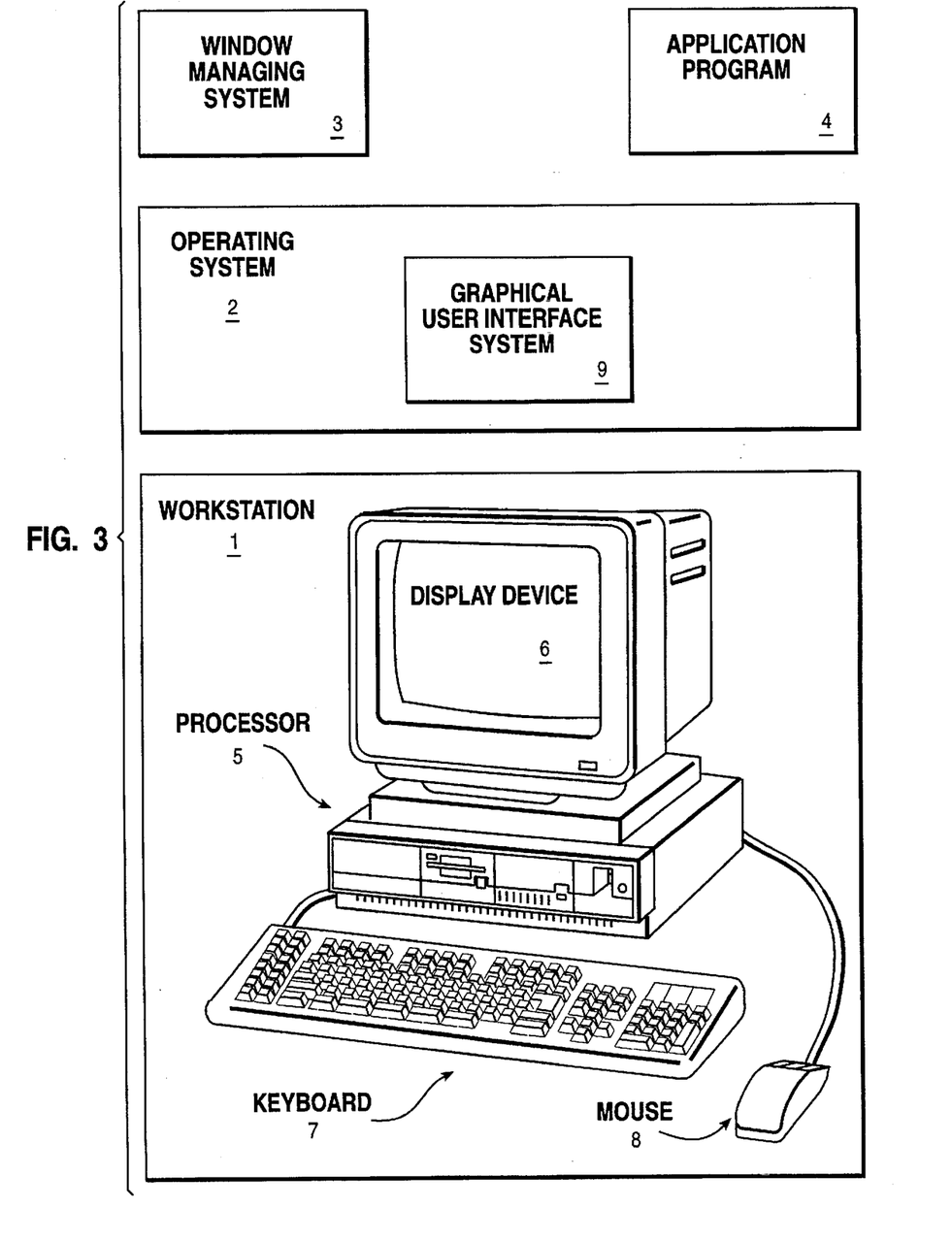
FIG. 3 is a diagram for generally explaining the embodiment of this invention.

FIG. 3 generally shows the system of the embodiment. In the figure, the system consists of workstation 1, operating system 2, window managing system 3 and application program 4. Workstation 1 is, for instance, an RS/6000 of Japan IBM Co., Ltd. (RS/6000 is a trademark of International Business Machines Corporation), and consists of processor 5, display device 6, keyboard 7, mouse 8, etc. Operating system 2 is, for instance, AIX/6000 of Japan IBM Co., Ltd. (AIX/6000 is a trademark of International Business Machines Corporation). The operating system 2 includes graphical user interface system 9, which manages the interaction between display device 6 and a user. The user interface system 9 is, for instance, OSF/Motif of Open System Foundation. The user interface system 9 also manages the information of the mouse cursor pointer controlled by a mouse.

The application program 4 is, for instance, a browser of a database or a source code browser of a program. Application program 4 generates the windows and sets the window views, namely, which data attributes to display, and supplies display data to user interface system 9 for displaying windows and data. For instance, in FIG. 2, four windows are formed, and in a respective one of each of these, a view of the branch name list, a view of annual sales for branch, a view of the employee name list of branch, and a view of the area diagram are set up.

To change the view of a window, the button for "list", "graph", "diagram", or "text" (not shown) for the window is selected. For instance, if a particular view of the list type is desired to be selected, the "list" button is clicked with the mouse button. Whereupon, the names of various views of the list type are displayed in a pop-up menu, and a choice is made among them by clicking. Similarly, clicking on the "graph" button allows selection of a view of the graph type, and clicking on the "diagram" or "text" button allows selection of a view of the corresponding type.

Figure 4:
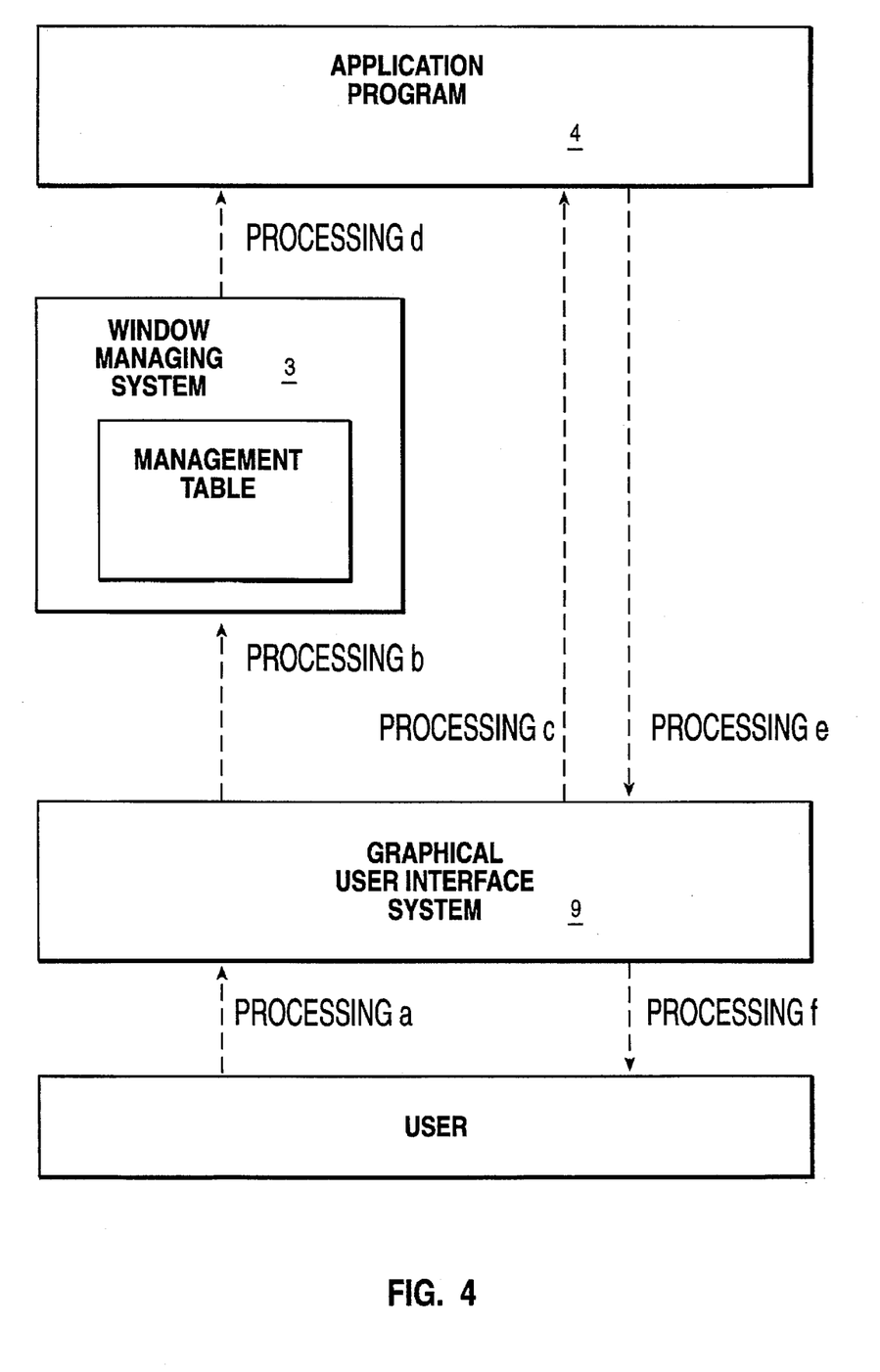
FIG. 4 is a diagram for explaining the main portion of FIG. 3.

FIG. 4 shows the configuration of the window managing system in FIG. 3 in greater detail. Window managing system 3 is located between application program 4 and user interface system 9. In window managing system 3, there is a management table used for automatic control of windows. A user uses application program 4 through user interface system 9. Processing flow a from the user is data generated by clicking by the mouse or character input from the keyboard. Input operations not related to window managing system 3 are directly passed to application program 4 along processing flow c. Those related to window managing system 3 first pass through window managing system 3 and their processing is transferred to application program 4 processings flow b and d. At this point, processing is performed using the management table. The output from application program 4 is directly passed to user interface system 9 in processing flow e.

Figure 5:
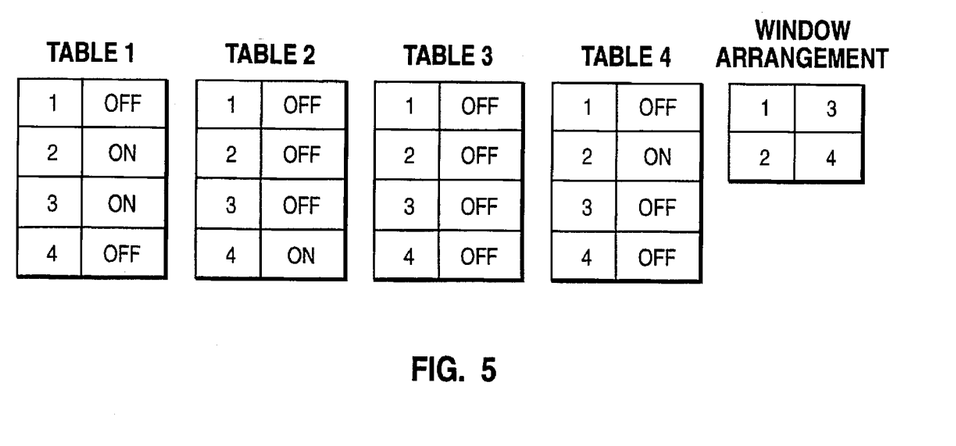
FIG. 5 is an illustration showing an example of the management table of window managing system 3 of FIG. 4.

FIG. 5 shows an example of the management table in window managing system 3. FIG. 5 also includes a window arrangement diagram, which shows the correspondence between the window numbers within the management table and the windows. As many tables as there are sub-windows used in application program 4 are prepared. In this example, the number of sub-windows is four. The number of items in each table is also made equal to the number of sub-windows. One item corresponds to each sub-window. Each item has "on" or "off" as a value. "On" represents that there is a relationship between windows, and "off" represents that there is no relationship.. FIG. 5 shows the management table for the example of FIG. 2. For instance, Table 1 shows the setting states of the quadrant buttons of the upper-left sub-window, in which the small buttons corresponding to the lower-left (item 2) and upper-right (item 3) sub-windows are set to "on" or relationships between windows exist.

Figure 6:
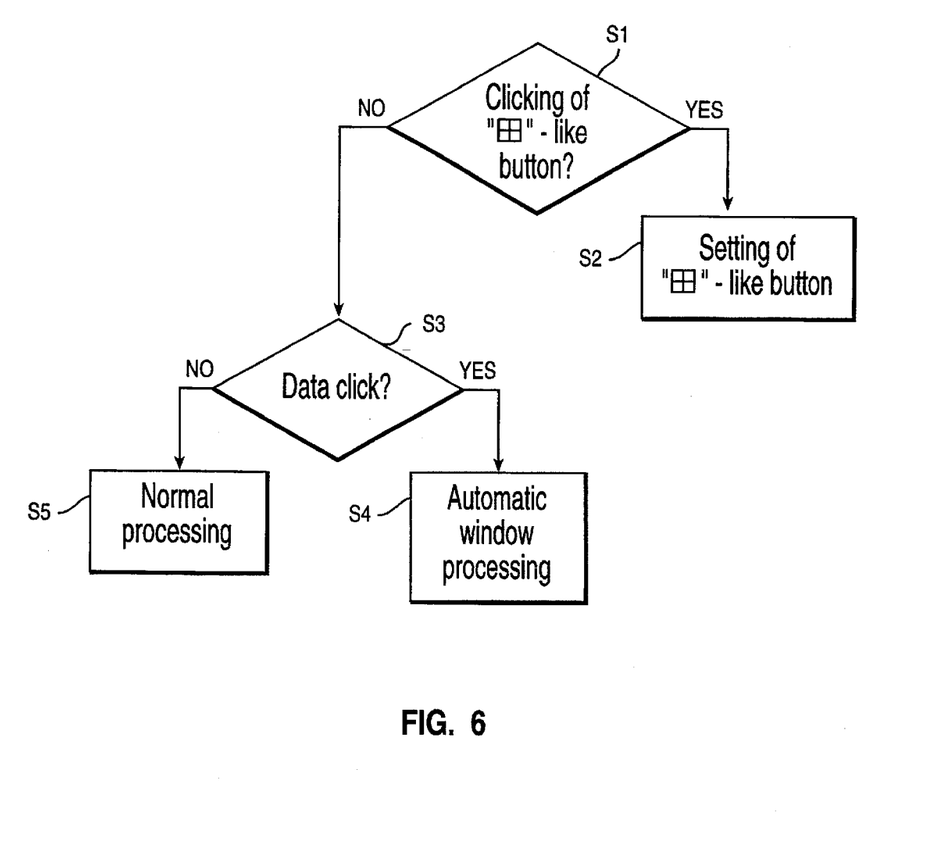
FIG. 6 is a diagram for explaining the operation of the embodiment of FIG. 3.

FIG. 6 shows an outline of the processing in the window management system. First, when the user processing performed through user interface system of a quadrant button, the setting process of the quadrant button is executed (S1, S2). When it is clicking of data on a sub-window, automatic window processing is performed (S3, S4). If the user processing is not the selection of a quadrant button or the selection of data, other processing is performed (S5). This other processing includes processing corresponding to input from a keyboard or the like, menu operations or clicking of a button other than the quadrant buttons associated with sub-windows, and also includes the respective specification of source and destination.

Figure 7:
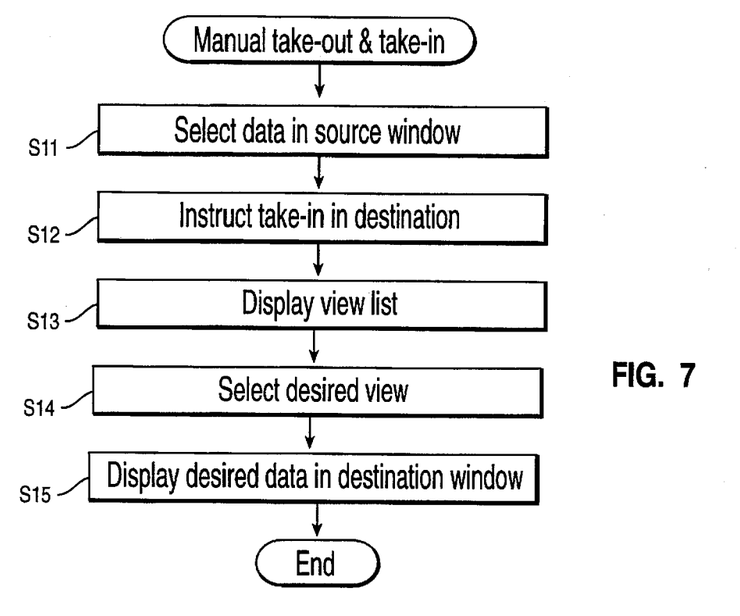
FIG. 7 is a flow chart for explaining the operation of the embodiment of FIG. 3.

The respective specification of source and destination will be described with reference to FIG. 7. First, selection is made by clicking data in a source window. For instance, "Hakozaki" in the branch name list window in FIG. 2 is specified (S11). In addition, it is assumed that the branch name list window has not yet been related to any other window at this point. If it is related, the related data is automatically displayed in the related window. Then the take-in button (not shown) of this window is clicked to set a destination window (S12). Thereafter, the view selection window (not shown) of the take-in data is clicked to cause the list of the take-in data views to be displayed in a pop-up menu, thereby allowing the user to select a view (S13, S14). There are selection buttons for list, graph, diagram and text views. The user specified data is displayed in the destination window (S15). For instance, if it is desired to display a list of big customers of this branch in the lower-left window (the employee name list is now displayed), the big customer data item is selected from the pop-up menu. The big customer list of the "Hakozaki" branch is displayed in the lower-left window.

Figure 8:
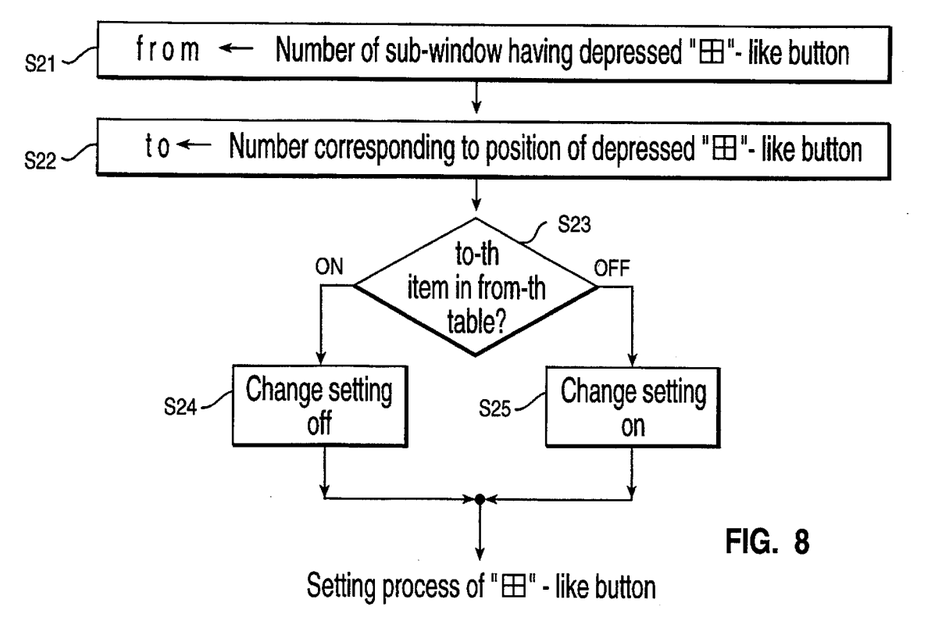
FIG. 8 is a flow chart for explaining the operation of the embodiment of FIG. 3; and, FIG. 9 is a flow chart for explaining the operation of the embodiment of FIG. 3.

The quadrant button setting process will now be described with reference to FIG. 8. First, the number of the window at which the depressed quadrant button is placed is set in a "from" register (S21). The sub-window number corresponding to the depressed one out of the four small buttons of the quadrant button is stored in a "to" register (S22). And, referring to the values of the "from" and "to" registers, the "to" item value in the "from" table is reversed. That is, if the item value is "on", it is reversed to "off", and reversed to "on" if it is "off" (S23, S24, S25). For instance, in FIG. 2, since the upper-right and lower-left buttons of the quadrant button of the branch name list are highlighted, the destination windows having the branch name list window as a source are the upper-right annual sales graph window and the lower-left employee name list window. In this state, if the upper-right button of the branch name list window is clicked, the highlight is turned off. That is, the relationship is reset. On the other hand, when the lower-right button of the quadrant buttons of the branch name list window is clicked, this button is highlighted to perform a relationship.

Figure 9:
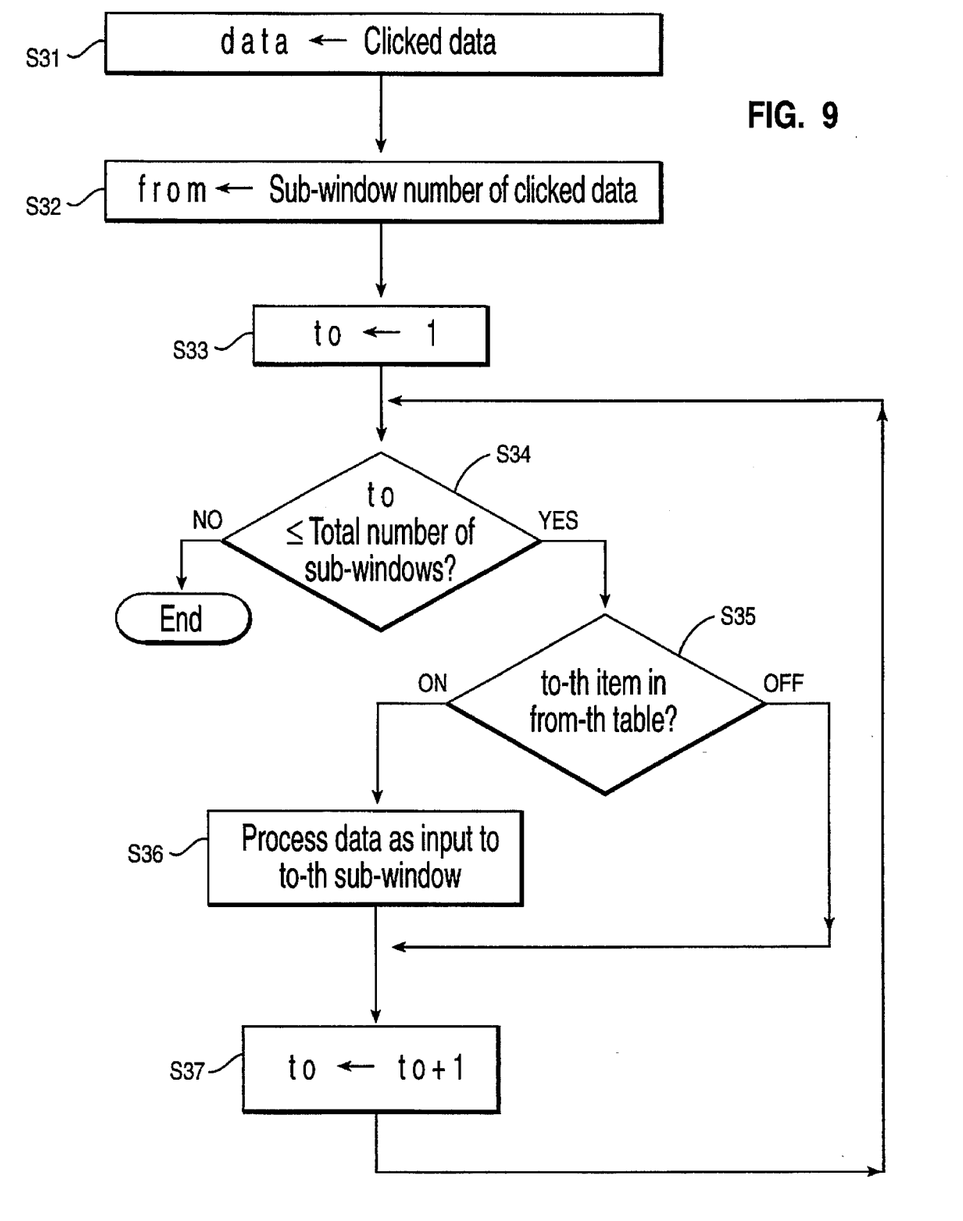

The automatic window processing is described below with reference to FIG. 9. If data is selected in a source window, the identifier of the selected data is set in a "data" register (S31). Further, the number of the sub-window in which the selected data is located is set in the "from" register (S32). Each item in the "from" table is examined, and if its value is "on", the desired attribute, i.e., the attribute to be displayed in the destination window of the data specified in the "data" register is displayed in the corresponding sub-window or destination window (S34 to S37).

For instance, consider the example in FIG. 2. In this case, as seen from the highlighting of the upper-right and lower-left buttons of the quadrant buttons of the branch name list, relationships have been set up in which the branch name list is the source and the upper-right annual sales graph window and the lower-left employee name list window are the destinations. The management table associated with this is as shown in Table 1 of FIG. 5.

If "Hakozaki" in the branch name last is selected at this point, the identifier "Hakozaki" is stored in the "data" register, and the window number of the upper-left branch name list window is stored in the "from" register. Then, the table of the values in the "from" register, that is, the table of "1's" is examined. Since the values for items 1, 2, 3 and 4 in Table 1 are "off", "on" "on" and "off", respectively, first, the display attribute value of the second window, that is the upper-right annual sales graph, is extracted from the identifier of "Hakozaki" and displayed in the upper-right annual sales graph window. Similarly, the display of the third window, the lower-left employee name list, is also automatically updated and displayed.

Although an example of four windows has been shown in the above description, this invention can generally be applied to two or more windows. Further, it can be expected that this application can be widely applied to program browsers or multimedia browsers having a plurality of windows. In addition, this invention can also be applied to overlapping windows, rather than a plurality of windows which are generated in the shape of tiles without overlapping each other. In this case, instead of the graphical objects symbolizing a two-dimensional window arrangement, the setting and displaying of the relationships between windows may be provided by three-dimensional graphical objects that also display the state of overlapping. The relationships between windows may also be various relationships in addition to the data take-out and take-in relationships described above. For instance, they may include a relationship in which the line positions and row positions of a list or text are linked.

As described above, in accordance with this invention, graphical objects for setting the relationships between a plurality of windows are displayed, the relationships can be set by operation on the graphical objects, for instance, by mouse click, and the setting can be represented by changes in the display mode of the graphical objects. Accordingly, the relationships between sub-windows are set for fixed operations, as is conventional, and relationships are performed for each operation if more flexible operations are required, whereby a wide range of demands by users can be fulfilled.

While the invention has been described with respect to particular embodiments above, it can be understood by those skilled in the art that modifications may be made without departing from the skill and scope of the present invention. These embodiments are for purposes of example and illustration only and are not to be taken to limit the scope of the invention narrower than the scope of the appended claims.

We claim:

1. A system for managing windows comprising:

a display means;

a means for concurrently displaying a plurality of windows and a plurality of graphical objects on the display screen of said display means, each of the graphical objects associated with a respective one of the plurality of windows;

a means for setting a set of relationships between the windows according to operations on the graphical objects; and, a means for changing the display mode of each of the graphical objects to depict which of the plurality of windows are related to its respective window.

2. The system for managing windows as recited in claim 1 wherein the plurality of windows are displayed in a fixed arrangement without overlapping each other.

3. The system for managing windows as recited in claim 2 wherein the plurality of windows are displayed within a parent window.

4. The system for managing windows as recited in claim 1 wherein each of the graphical objects is displayed in its respective window.

5. The system for managing windows as recited in claim 1 wherein the graphical objects are displayed close to their respective windows.

6. The system for managing windows are recited in claim 1 wherein each of the graphical objects comprise a plurality of button representations respectively corresponding to the plurality of windows, the plurality of button representations being arranged in the arrangement of the plurality of windows.

7. The system for managing windows as recited in claim 6 wherein the relationship setting means sets up relationships between the window corresponding to a graphical object upon which user operations have been performed and other windows on the button representations.

8. A method for managing windows comprising the steps of:

concurrently displaying a plurality of windows and a plurality of graphical objects on a display screen of a display means, each graphical object corresponding to a respective one of the plurality of windows;

setting a relationship between selected ones of the plurality of windows according to operations on the graphical objects; and, changing the display mode of the graphical objects according to the relationship which have been set between selected ones of said plurality of windows.

9. A computer program product for managing windows executable by a computer comprising:

program code means for displaying a plurality of windows and a plurality of graphical objects on a display screen of a display means each graphical object corresponding to a respective one of the plurality of windows;

program code means for setting a relationship between selected ones of the plurality of windows according to the operations of said graphical objects; and, program code means for changing the display mode of said graphical objects according to the relationships which have been set between its respective window and others of the said plurality of windows.

10. A database system comprising:

a display means;

a means for displaying a plurality of windows and a plurality of graphical objects on a display screen of a display means each of which corresponds to a respective one of the plurality of windows;

a storage means for storing information;

a means for respectively setting a set of views of said plurality of windows;

a means for displaying the information in the plurality of windows according to the set of views;

a means for operating the graphical objects to set up a master-slave relationship between the windows; and, a means for changing the display mode of each of the graphical objects according to, the relationship of its respective window and others of the plurality of windows wherein according to a data instance specifying operation in a master window, the display contents of a slave window are changed to display a set of attributes of a specified data instance.

11. A system for managing windows comprising:

means for concurrently displaying a plurality of windows and a graphical object associated with a single window in the plurality of windows on a display;

means for setting a relationship between the single window and other windows in the plurality of windows according to operations on the graphical object; and means for changing the display of the graphical object according to the relationship of the single window and the other windows.

12. The system as recited in claim 11 wherein the graphical object is displayed to resemble the arrangement of the plurality of windows on the display.

13. The system as recited in claim 12 wherein the relationship setting means sets a relationship between the single window and a window which corresponds in spatial arrangement within the plurality of windows to an operated portion of the graphical object.

14. A method for managing windows comprising:

concurrently displaying a plurality of windows and a graphical object associated with a single window in the plurality of windows on a display;

setting a relationships between the single window and other windows in the plurality of windows according to operations on the graphical object; and changing the display of the graphical object according to the relationship of the single window and the other windows.

15. The method as recited in claim 14 wherein the graphical object is displayed to resemble the arrangement of the plurality of windows on the display.

16. The method as recited in claim 15 wherein the relationship setting means sets a relationship between the single window and a window which corresponds in spatial arrangement within the plurality of windows to an operated portion of the graphical object.

* * * * *